Aug. 31, 1943.  J. L. EDINGTON  2,328,330
RUBBER BUSHED JOINT
Filed Dec. 4, 1941
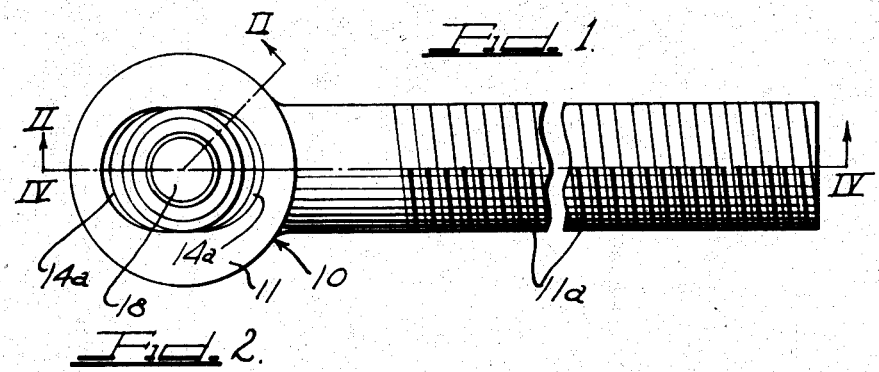
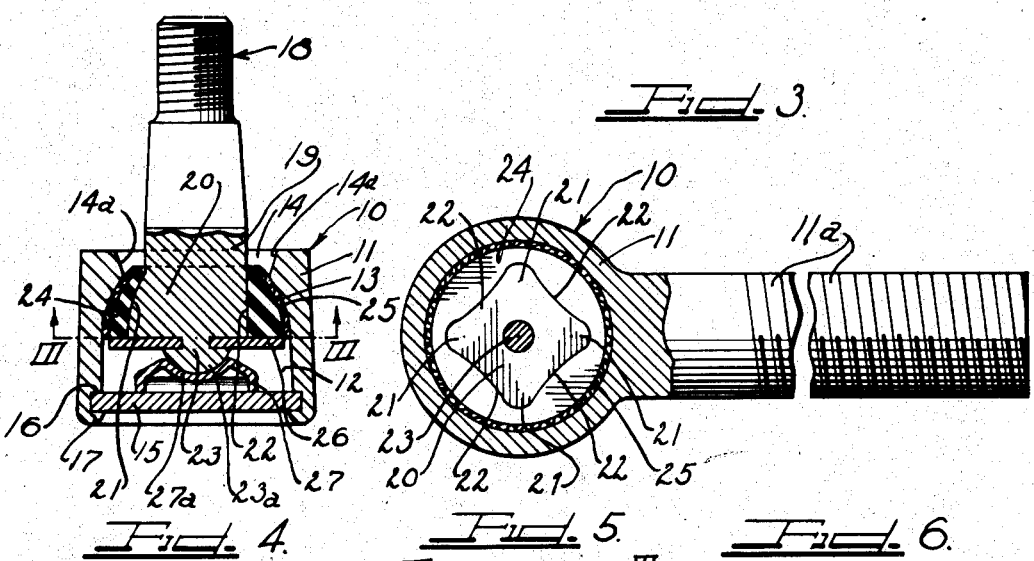
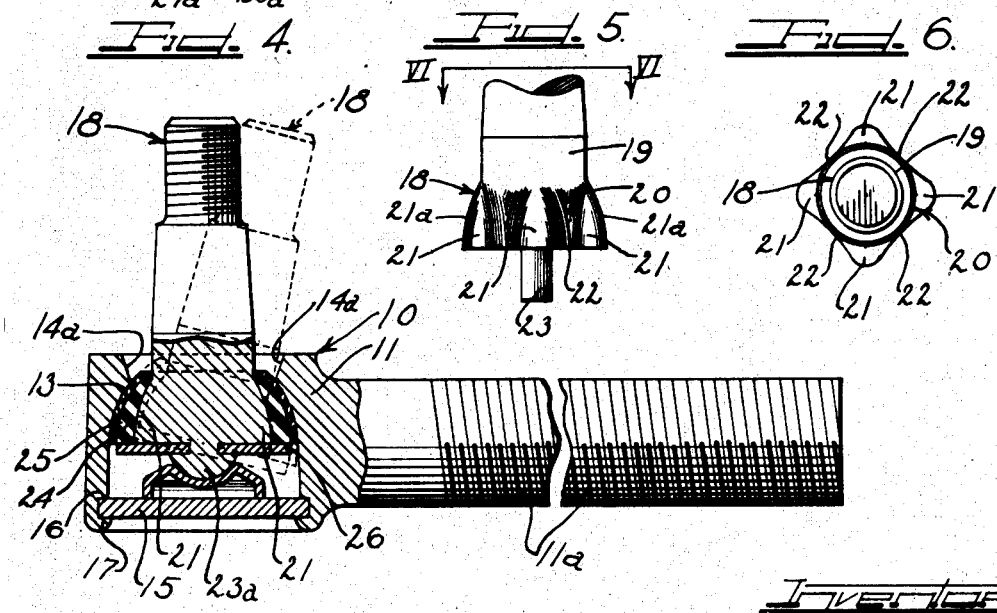
Inventor
JACK L. EDINGTON Patented Aug. 31, 1943

2,328,330

UNITED STATES PATENT OFFICE 2,328,330

RUBBER BUSHED JOINT

Jack L. Edington, Detroit, Mich., assignor to Thompson Products Incorporated, Cleveland, Ohio, a corporation of Ohio Application December 4, 1941, Serial No. 421,555

4 Claims. (Cl. 287—85)

This invention relates to universal type joints and especially to tie rod or automotive steering assembly joints wherein the preloading of a resilient bushing member in the joint avoids the necessity of spring wear take-up means.

Specifically the invention relates to inexpensive tie rod type universal joints embodying a fluted stud member carrying a fabric-covered rubber bushing for acting as a stud head to cooperate with a socket and permit relative rotational movements as well as relative tilting movements between the stud and socket.

In accordance with the invention a metal stud is provided with a fluted head portion and a lug projecting from the bottom of the head portion at the axial center of the stud. An apertured rubber bushing having a segmental spherical outer face covered with a lubricant-impregnated flexible fabric is disposed around the fluted head portion of the stud. The aperture of the bushing can be complementarily shaped to seat in the stud flutes so as to snugly engage the fluted head of the stud. The bushing is preferably bonded to the fluted stud head as by vulcanizing, cementing or the like, or can, if desired, be molded on the stud. A washer of larger diameter than the stud head is then disposed around the projecting lug to form a bottom or shoulder for the rubber bushing. The lug is then headed to provide a semi-spherical head for retaining the washer in position. A socket with a segmental-spherical bearing wall is provided to receive, in bearing relation on its bearing wall, the flexible fabric cover of the bushing.

A cap having a spherically depressed head portion is disposed over the head of the lug and a closure plate for the socket is then spun into the socket for urging the cap toward the stud to load the rubber bushing.

The loaded rubber bushing urges the flexible fabric into proper bearing engagement with the socket bearing wall and this fabric can tilt in all planes as well as rotate relative to the socket. As wear develops between the bearing parts the loaded or stressed rubber bushing will urge the fabric into full seated engagement with any worn surfaces so as to prevent the stud from becoming loose in the socket.

It is, then, an object of this invention to provide an inexpensive tie rod type universal joint having a preloaded bushing to maintain proper bearing relation between the bearing parts.

Another object of this invention is to provide a ball and socket type joint with a loaded bushing member urging the bearing surface of the ball member into proper bearing engagement with the socket bearing wall.

A still further object of this invention is to provide an inexpensive rubber bushed universal type joint having shock absorbing properties.

Another object of this invention is to maintain proper bearing engagement between a metal bearing surface and a fabric bearing surface by urging the fabric bearing surface against the metal surface with a preloaded rubber bushing.

Other and further objects of the invention will become apparent to those skilled in the art from the following detailed description of the annexed sheet of drawings which, by way of preferred example, illustrate one embodiment of the invention.

On the drawing:

Figure 1 is a broken top plan view of a tie rod joint according to this invention.

Figure 2 is a vertical cross-sectional view, with parts in elevation, taken along the line II—II of Figure 1.

Figure 3 is a broken horizontal cross-sectional view, with parts in elevation, taken along the line III—III of Fig. 2.

Figure 4 is a vertical cross-sectional view, with parts in elevation and broken away, taken along the line IV—IV of Figure 1 and illustrating in dotted lines a tilted position for the stud.

Figure 5 is a side elevational view of the metal joint stud head.

Figure 6 is a top plan view of the stud shown in Figure 5.

As shown on the drawing:

In Figures 1 to 4 the reference numeral 10 designates generally a tie rod joint including a socket 11 having a laterally extending threaded shank portion 11a for threaded insertion into the end of a tie rod. The socket 11 defines a socket chamber 12 having a segmental spherical inner bearing wall 13 which converges inwardly to provide a reduced opening 14 at the top of the socket chamber. As shown in Figures 1, 2 and 4, this opening 14 is beveled at 14a thereby increasing the angularity through which the stud member may be tilted in planes parallel with the axis of the shank.

The open bottom end of the socket chamber 12 is closed by a plate or disk 15 which is seated in the socket mouth against a shoulder 16. The end of the socket can then be peened as at 17 over the peripheral margin of the disk 15 to securely hold the plate in fixed relation to the housing.

As best shown in Figures 2 and 4, a stud 18 has the usual shank 19 projecting through the opening 14 of the socket 11 and has a head 20 disposed in the socket chamber 12. The head 20 of the stud has four ribs 21 spaced equally therearound and separated by flutes 22 which are substantially flush with the shank portion 19 as indicated in Figures 2 and 6.

The ribs 21 extend longitudinally of the stud 18 and have segmental cylindrical exterior surfaces converging into the shank portion 19.

A lug 23 depends from the bottom of the head 20 at the axial center thereof.

A rubber bushing 24 having a fluted aperture therethrough complementary in shape with the stud head 20 is snugly disposed around the stud head. If desired the rubber bushing may be vulcanized to the stud head or it may have a straight cylindrical bore therethrough adapted to snugly engage the cylindrical shank portion 19 of the stud and be deformed by the ribs 21 into snug fitting engagement with the stud head.

The rubber bushing 24 carries on its exterior surface a lubricant-impregnated flexible fabric covering 25 presenting a segmental spherical outer bearing wall. The fabric 25 may be secured to the bushing 24 in any suitable manner such as by vulcanizing, cementing or the like. Alternatively, the fabric 25 may be replaced with a metal shell.

The exterior segmental spherical surface of the covering 25 seats on the segmental spherical inner bearing wall 13 of the socket 11.

The ribs 21 on the stud head prevent any relative rotation between the bushing and the stud.

A washer or apertured disk 26 is disposed around the lug 23 of the stud to seat against the bottom of the stud head and project under the bushing 24 to form a bottom support for the bushing. The lug, after receiving the washer thereon, is headed as by peening to provide a segmental spherical head 23a thereon.

A cap member 27 having a depressed segmental spherical portion 27a in the head thereof receives the headed portion of the lug in bearing engagement therewith.

In accordance with this invention the closure plate 15 urges the cap 27 tightly against the headed end 23a of the stud lug to force the stud head toward the socket opening 14 and thereby load the rubber bushing 24. This loading of the rubber bushing places the same under stress to urge the covering 25 thereon into proper bearing engagement with the socket bearing wall. As wear develops in the bearing surfaces, the stressed bushing will tend to reclaim its unstressed shape and will automatically compensate for any wear developed in the bearing parts.

As shown in Figure 4, the stud 18 is adapted to tilt relative to the socket 11 through a wide angle in planes parallel with the axis of the socket shank 11a. The stud is also adapted to tilt in any other planes but to a lesser extent since the opening 14 is only relieved as indicated at 14a.

The stud is also free to rotate about its own axis relative to the socket since both the bearing surface of the covering 25 and the bearing surface 13 of the socket are segmental spherical in shape.

From the above descriptions it will be understood that the invention now provides an inexpensive springless universal type joint having wear take-up features and shock absorbing properties. The preloading of the rubber bushing eliminates undesired lost motion action due to softness of the rubber.

If thick blocks of unloaded rubber are used in steering assembly joints, they will cause lost motion and "soft" or "mushy" steering will result.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint construction comprising a socket member having an interior wall accommodating tilting and rotating movements, a stud having a ribbed head disposed in said socket, a rubber bushing carried by said stud head and held against rotation relative to the stud by said ribs, a lubricant-impregnated flexible fabric covering on said rubber bushing in bearing engagement with said socket bearing wall, means on said stud providing a bottom for said bushing, a rounded button end on said stud, a cap member in said socket receiving said button end, and a closure plate secured in said socket urging the cap against the button end for preloading the rubber bushing to maintain the fabric covering in proper bearing engagement with the socket bearing wall.

2. A tie rod joint comprising a socket having an interior bearing wall accommodating tilting and rotating movements, a stud having a longitudinally ribbed head disposed in said socket, a rubber bushing carried by said head and snugly engaging the ribs thereof, a lubricant-impregnated flexible fabric covering on said bushing presenting a segmental spherical bearing wall for engagement with the socket bearing wall, a lug projecting from the bottom of the stud head at the axial center thereof, an apertured disk disposed around said lug and bottoming said bushing, a rounded head on said lug retaining the apertured disk in position on the stud, means in said socket receiving the rounded lug head in bearing engagement therewith, and a closure plate in said socket thrusting against said means to preload the rubber bushing for urging the fabric covering in proper bearing engagement with the socket bearing wall.

3. A joint construction comprising a housing defining a socket chamber with a large open end, a converging bearing wall portion, and a reduced opposite open end, a stud having a head disposed in said socket chamber, a resilient bushing unit snugly seated around said stud head in fixed relation thereto, a covering of bearing material for said resilient bushing tiltable and rotatable on said converging bearing wall portion of the housing, and means for loading said bushing to urge the covering thereon into bearing engagement with the bearing wall portion of the socket.

4. In a joint construction including a socket member providing a bearing wall accommodating tilting and rotating movements and a cooperating bearing wall in the socket tiltable and rotatable on the socket bearing wall, the improvements of a loaded resilient bushing urging the cooperating bearing wall into proper engagement with the socket bearing wall and a rigid fluted head carrying said loaded resilient bushing.

JACK L. EDINGTON.